United States Patent [19]

Schlessmann

[11] Patent Number: 5,330,138
[45] Date of Patent: Jul. 19, 1994

[54] CABLE SUPPORT FOR AN ELECTRICALLY-OPERATED PORTABLE HANDHELD WORK APPARATUS

[75] Inventor: Helmut Schlessmann, Waiblingen, Fed. Rep. of Germany

[73] Assignee: Andreas Stihl, Waiblingen, Fed. Rep. of Germany

[21] Appl. No.: 906,494

[22] Filed: Jun. 30, 1992

[30] Foreign Application Priority Data

Jun. 30, 1991 [DE] Fed. Rep. of Germany ....... 4121423

[51] Int. Cl.$^5$ .......................... F16G 11/04; F16L 3/00
[52] U.S. Cl. .................................. 248/52; 248/316.2; 24/132 R
[58] Field of Search ............. 248/51, 52, 316.2, 316.5; 24/132 R, 134 R, 136 L, 543; 30/276, 296.1

[56] References Cited

U.S. PATENT DOCUMENTS

| | | | |
|---|---|---|---|
| 3,251,107 | 5/1966 | Scott | 24/134 R |
| 3,354,518 | 11/1967 | Hoover | 24/134 R |
| 4,106,165 | 8/1978 | Clowers et al. | 24/134 R |
| 4,752,991 | 6/1988 | Wegner | 24/132 R |
| 5,050,786 | 9/1991 | DeMott | 24/134 R X |

FOREIGN PATENT DOCUMENTS 8025512 1/1981 Fed. Rep. of Germany .
1325227 7/1987 U.S.S.R. ............................ 24/132 R Primary Examiner—Eugenia Jones
Attorney, Agent, or Firm—Walter Ottesen

[57] ABSTRACT

A cable holder for relieving strain on the current-supply cable of a portable handheld electrically-operated work apparatus such as a lawn mower or brushcutter. The cable holder includes a chamber fixed to the apparatus and a closure piece which is pivotally journalled on the chamber. The closure piece and a wall of the chamber conjointly define a latch for holding a segment of the cable. In its at-rest position, the closure piece blocks access to the receptacle for the cable segment to be clamped with the receptacle being defined by the chamber. The cable segment held by the cable holder is part of a cable loop of an extension cable for supplying current to the work apparatus from a remote location. The cable segment is inserted into the receptacle by pushing the cable segment into the chamber thereby causing the closure piece to pivot into its release position. Thereafter, the closure piece is returned to its at-rest position, which is now effectively a clamping position. Part of the closure piece is formed as a grab portion which can be pulled by an operator to open the clamp.

11 Claims, 4 Drawing Sheets

CABLE SUPPORT FOR AN ELECTRICALLY-OPERATED PORTABLE HANDHELD WORK APPARATUS

FIELD OF THE INVENTION

The invention relates to a cable holder for an electrically-operated handheld work apparatus, especially a garden apparatus such as a brushcutter, lawn mower and the like.

BACKGROUND OF THE INVENTION

A cable holder having strain relief for the current supply cable of a work apparatus is most of all advantageous when the current supply cable for the electric motor of the apparatus has a pregiven length which must not be exceeded because of safety regulations. An extension cable is then required to provide a connection to a distant current supply with the extension cable being connected to the cable attached to the work apparatus by means of a coupling. Stress loads are unavoidable when working with the apparatus and can lead to the condition wherein the connection is interrupted at the coupling.

A cable holder is disclosed in published German utility model registration 8,025,512 which can be hooked onto the work apparatus, for example, on the holding bar of the apparatus. The cable holder includes a base plate which has a pass-through opening defining a receiving opening for a cable segment which is hooked into a loop-shaped projection of the base plate. This projection and a rib formed on this projection conjointly define a clamp for providing strain relief for the cable. Threading the loop-shaped cable segment through the receiving opening is inconvenient as is loosening the cable loop from the clamp. Since the cable holder is hung loosely on the apparatus or is carried by the operator, the cable holder is hardly suitable for providing strain relief for the extension cable since, for an unwanted movement of the cable holder, the tension force can be partially transmitted to the cable connection at the apparatus.

SUMMARY OF THE INVENTION

It is an object of the invention to provide a cable holder which is so mounted and configured that a simple use thereof by the operator is provided while providing a reliable strain relief.

The cable holder of the invention is for an electrically-operated portable handheld work apparatus and includes: wall means fixed on the work apparatus for defining a chamber; the chamber defining a receptacle for receiving a segment of the cable therein; a closure piece pivotally mounted on the wall means so as to be movable about a pivot axis between a blocking position wherein the closure piece and the wall means conjointly block access to the receptacle and a release position wherein the receptacle is accessible for inserting or withdrawing the cable segment.

Because of the chamber fixed to the apparatus and the closure piece, it is ensured that the tension and clamping forces can be taken up directly by the work apparatus and have no effect on the cable end leading into the apparatus. In this way, the cable connection provided and especially a connecting plug is relieved of these forces. The pivotal journalling of the closure piece makes it possible to block the access to the receiving opening in a simple manner and to clear this opening. The cable segment is easily inserted into the receiving opening when the closure piece is opened and can be reliably held in the receiving opening after the closure piece is pivoted closed.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
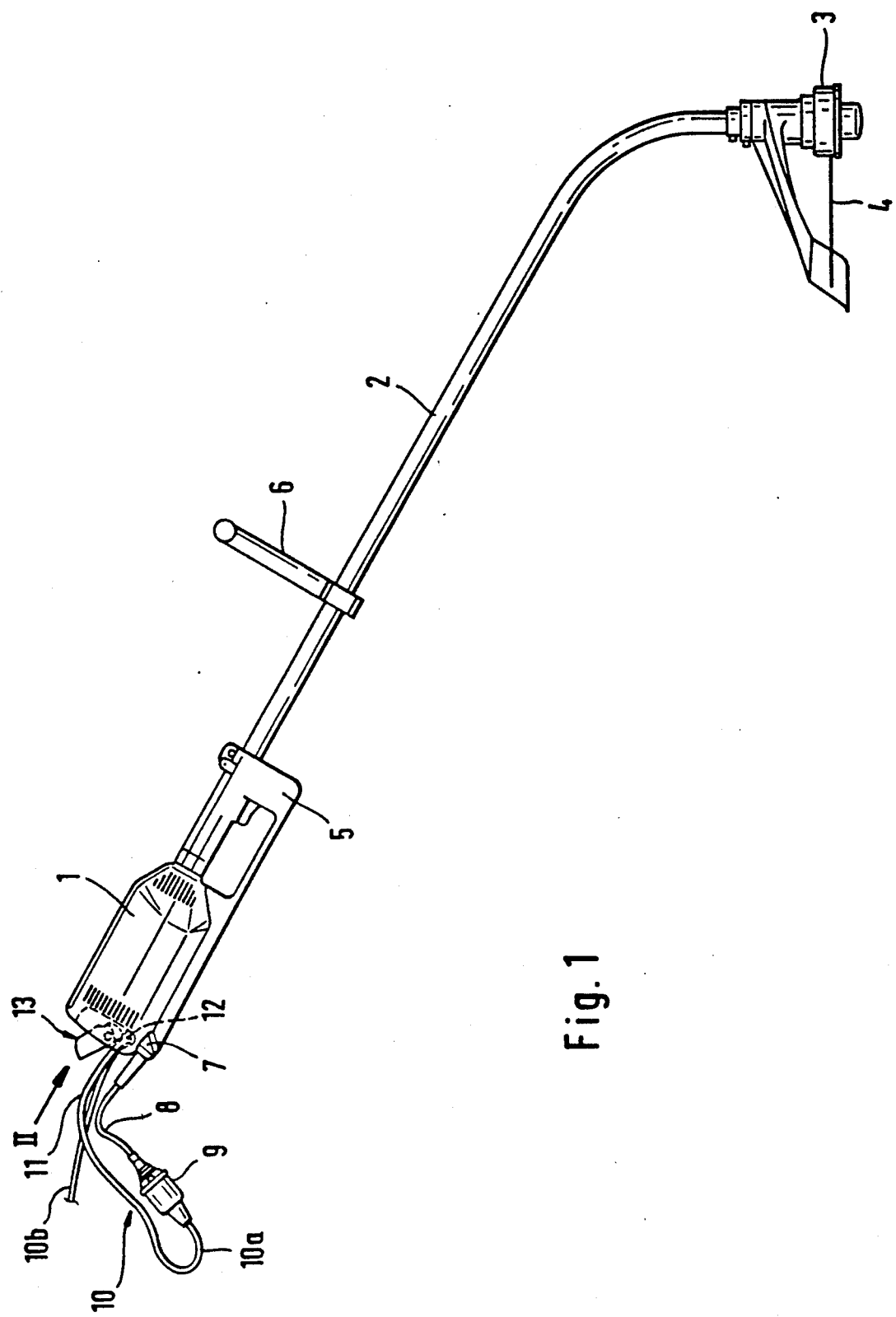
FIG. 1 is a side elevation view of a brushcutter equipped with a cable holder according to the invention.

The schematic side elevation view of FIG. 1 shows a brushcutter of the kind used for cutting grass or brush beneath trees and shrubs. The work apparatus has a housing 1 which encloses an electric motor (not shown) which is drive-connected via a shaft (not shown) to a cutterhead 3. The flexible shaft is disposed in a tube 2 and the cutterhead 3 carries a cutting tool 4 which is rotatably driven by the flexible shaft. The housing 1 has a holding handle 5 and a guide handle 6 is mounted on the tube 2 so that the apparatus can be manually held and guided. A cable pass-through 7 is provided at the base of the housing 1. A connecting cable 8 for the current supply of the electric motor is passed to the outside through the cable pass-through 7. The connecting cable 8 is connected via a coupling plug 9 to an extension cable 10. The cable 10 is bent to a loop 11 near the housing 1 so that an arc-shaped cable segment 12 results which is held clamped by means of the cable holder 13 in order to relieve the cable segment 10a of strain which acts on the cable segment 10b extending from the loop 11. The cable segment 10a is connected to the coupling plug 9.

Figure 2:
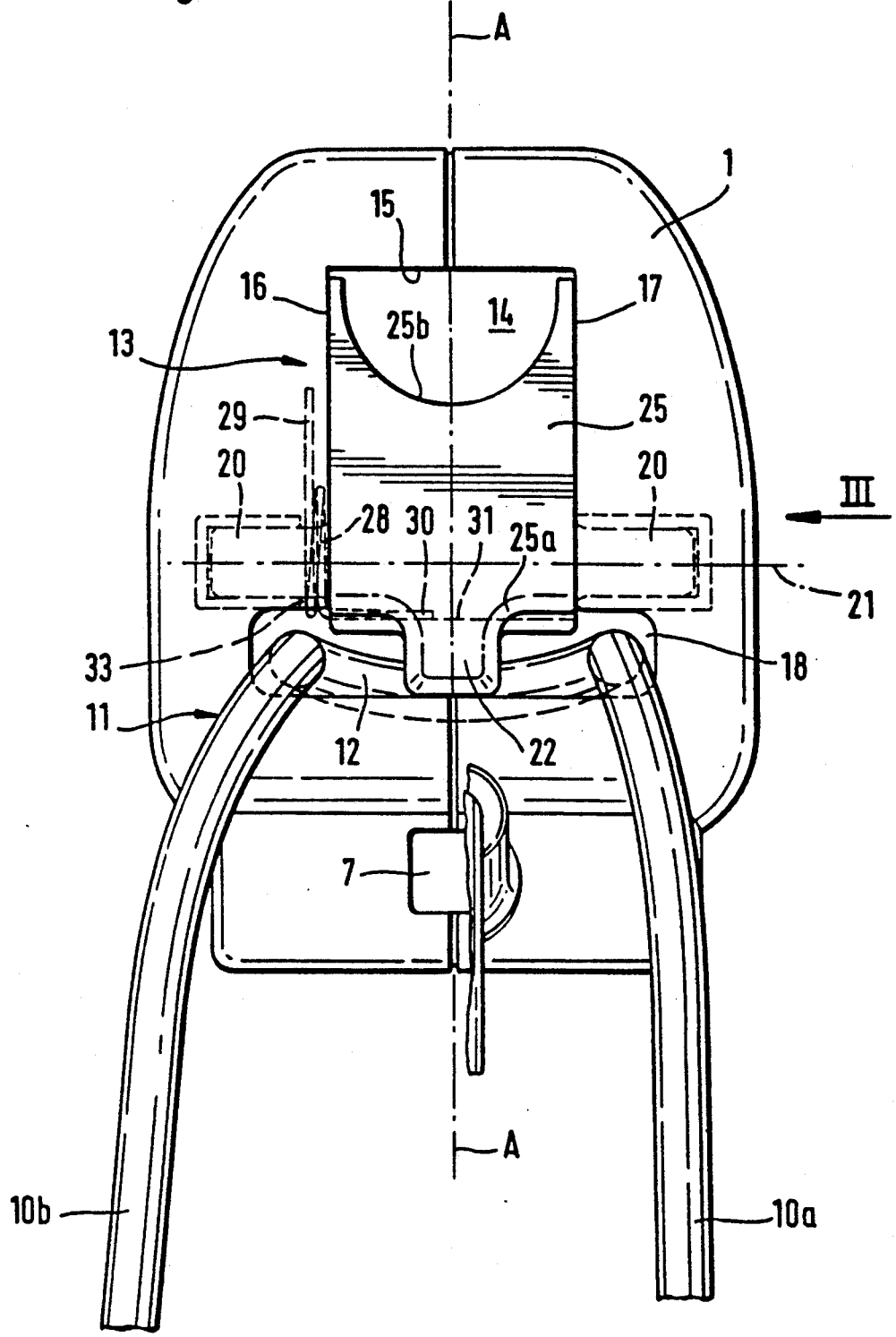
FIG. 2 is a partial view taken in the direction of arrow II of FIG. 1 and is shown enlarged with the closure piece of the cable holder in its closed position.
Figure 3:
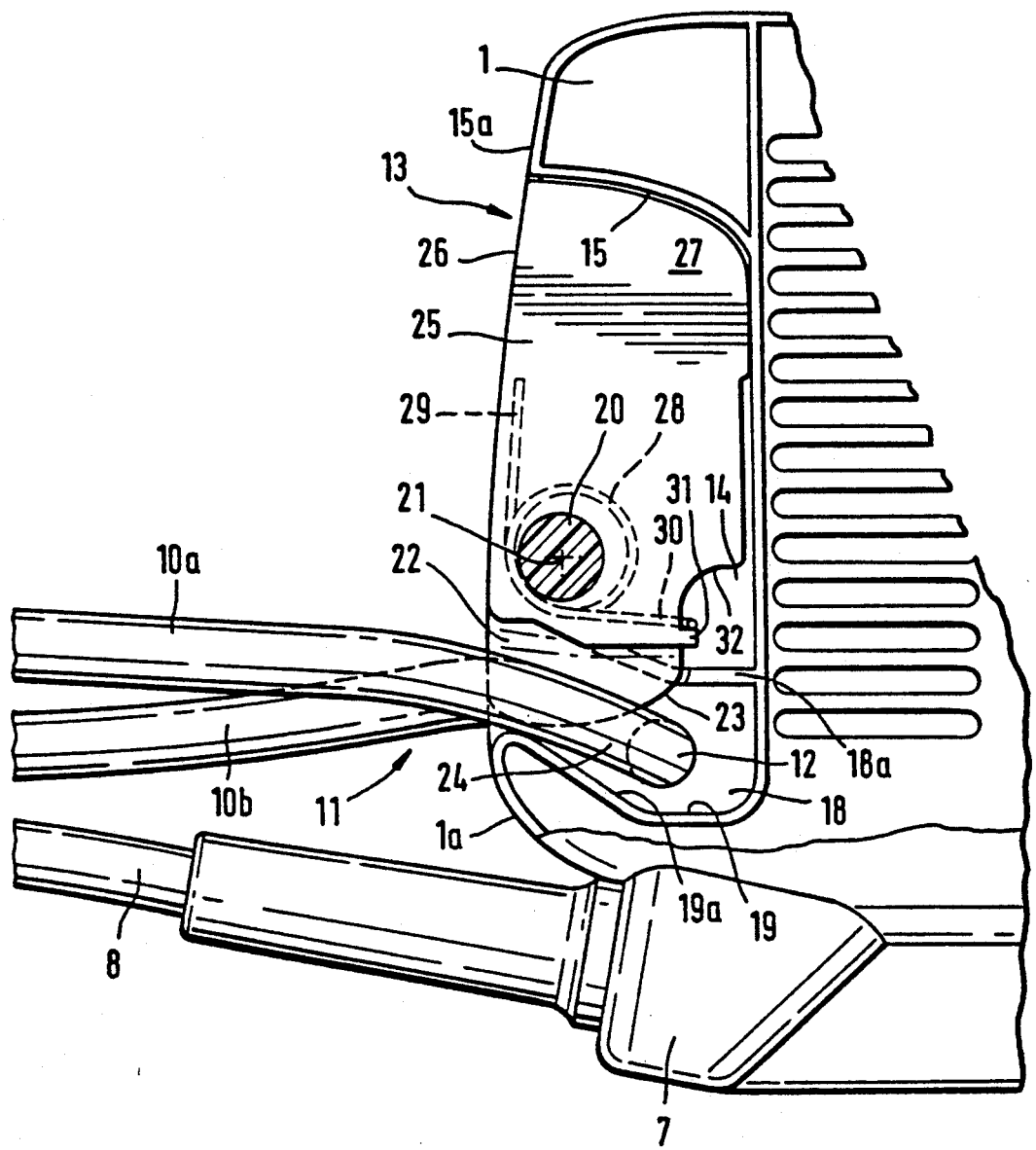
FIG. 3 is a side elevation view taken in the direction of arrow III of FIG. 2 with the side wall of the apparatus housing being omitted in the area of the cable holder; and, FIG. 4 is a side elevation view corresponding to the view of FIG. 3 with the closure piece of the cable holder in its open position.
Figure 4:
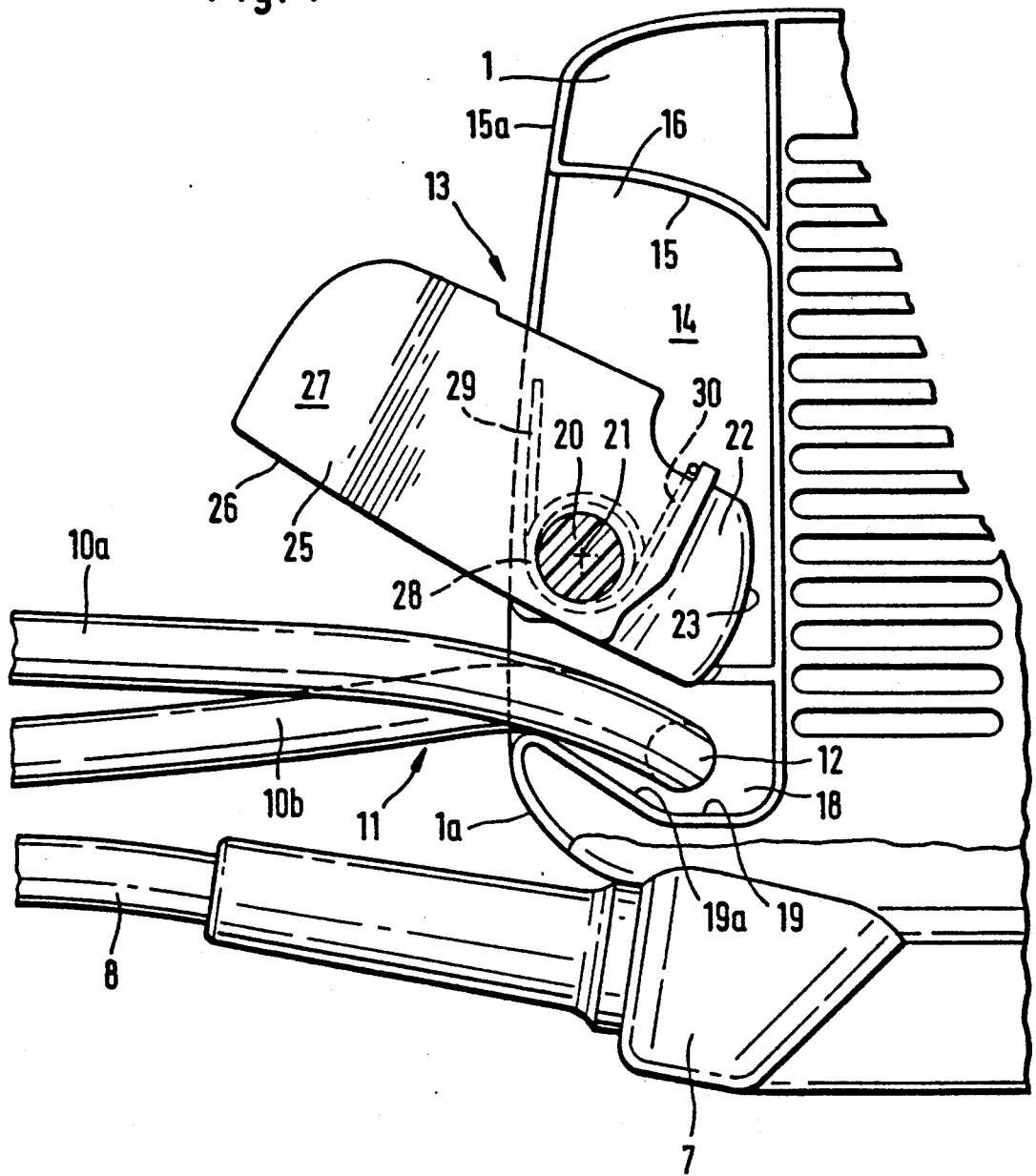

FIGS. 2 to 4 show the configuration and function of the cable holder 13.

As shown in FIG. 2, the housing 1 is configured so as to be partitioned along the center plane A—A and defines two halves of a chamber 14 having an upper wall 15 likewise partitioned in the plane A—A and two side walls 16 and 17. The upper wall 15 borders on an end wall 15a which is part of the housing 1.

The chamber 14 is expanded in the lower region to define a receiving opening 18 for the cable segment 12 with the receiving opening 18 being delimited by an upper wall 18a so that the cable loop is not clamped when opening the closure piece 22. The receiving opening 18 is delimited by a chamber wall 19 at the bottom thereof with the chamber wall 19 being formed by a housing part 1a.

Two openings for two lugs 20 are provided in the two side housing parts defining the side walls 16 and 17 of the chamber 14. The lugs 20 are arranged laterally on the closure piece 22. The lugs 20 conjointly define a pivot axis 21 for the closure piece 22 which passes transversely through the chamber 14. The closure piece 22 has a clamping surface 23 facing the receiving opening 18 which, in FIGS. 3 and 4, extends arcuately with respect to the pivot axis 21.

A part 19a of the chamber wall 19 rising outwardly and the clamping surface 23 of the closure piece 22 conjointly define a clamp having a funnel-shaped closure gap 24 widening inwardly when the closure piece is in the clamping position (FIG. 3) wherein access to the receiving opening 18 is blocked. The cable segment 11 is clamped by latch means (22, 19a) in the closure gap 24 when a pull force is applied to the cable segment 10b. The clamping action is supported in that the receiving opening 18 together with the side walls conjointly define a turn-around guide for the loop 11 of the cable 10.

The closure piece 22 is configured as one piece with a holder or grab portion 25 having a U-shape when viewed in cross section and correspondingly has an end wall 26 and side walls 27. The closure piece 22 defines a lower projection of the handle 25 (symmetrical to center plane A—A) having a reinforcement bead 25a at its lower end which extends also along the side walls 27 of the handle. The closure piece 22 is narrower than the handle 25 in the end view (FIG. 2) so that the cable loop 11 has sufficient space. At its upper edge, the handle 25 has an arcuately-shaped cutout for forming a depression 25b.

The handle or grab portion 25 is pivotable about the axis 21 by means of the two lugs 20. One of the two lugs 20 is surrounded on the outer side of the corresponding side wall 27 by the turns of a leg spring 28. One leg 29 of the spring is braced against the chamber wall 16 and the other leg 30 holdingly engages the rearward projection 31 of the one side wall 27 of the handle 25. The projection 31 defines the lower end of a cutout 32 of the wall 27. The leg 29 of the spring 28 engages in a recess 33 which is provided on the chamber side wall 16 in the housing 1.

As a comparison of FIGS. 3 and 4 shows, the handle 25 and the closure piece 22, which is configured with the handle 25 as one piece, define a two-armed lever which is pivotable about the lugs 20 having respective center axes which conjointly define the pivot axis 21. The lever is pivoted when the cable loop 11 is introduced into the receiving opening 18. Pressure is applied to the closure piece 22 so as to pivot the same into its release position so that the cable segment 12 easily enters the receiving opening 18 (FIG. 4). As soon as the cable segment 12 reaches its intended position in the opening 18, the closure piece 25 pivots under the force of the leg spring 28 into the closure position (FIG. 3) with the arcuately shaped clamping surface 23 of the closure piece 22 being pivoted over the cable segment 12 and defining the closure gap 24 together with the chamber wall 19a.

In the blocking position, the handle 25 and the closure piece 22 are arranged so as to be recessed in the chamber 14 as shown in FIG. 3. In this way, the end wall 26 of the handle 25 lies on the rear side of the chamber 14 and closes flush with the part 15a of the chamber wall defined by the housing 1.

To remove the cable loop 11 with the cable segment 12 from the receiving opening 18, the handle 25 must only be pivoted forwardly manually which is facilitated by the handle depression 25b. The handle 25 can be released after removing the cable loop 11. The handle 25 then returns to the position shown in FIG. 3 under the force of leg spring 28.

It is understood that the foregoing description is that of the preferred embodiments of the invention and that various changes and modifications may be made thereto without departing from the spirit and scope of the invention as defined in the appended claims.

What is claimed is:

1. A cable holder for an electrically-operated portable handheld work apparatus supplied with electrical energy via an electric cable, the cable holder comprising:

wall means fixed on said work apparatus for defining a chamber therein;

a closure piece disposed in said chamber and delimiting a recess within said chamber for receiving a loop-like segment of the cable therein;

pivot means for pivotally mounting said closure piece in said chamber so as be to pivotally movable about a pivot axis between a predetermined first position wherein said wall means and said closure piece conjointly define an opening to said recess for allowing said loop-like segment of the cable to be inserted through said opening and into said recess and a predetermined second position wherein said closure piece blocks said opening to hold said segment in said recess without applying a clamping force to said loop-like segment;

said closure piece and said wall means conjointly defining wedge-shaped holding means when said closure piece is in said second position for permitting said loop-like segment to become wedged in said wedge-shaped holding means when a pulling force is applied to said cable in the course of work with said work apparatus; and, resilient biasing means for resiliently biasing said closure piece into said second position.

2. The cable holder of claim 1, said wall means including two mutually adjacent side walls; and, said pivot means including pivot pins for pivotally journalling said closure piece in said side walls so as to permit said closure piece to pivot about said axis.

3. The cable holder of claim 2, said closure piece including a grab portion for facilitating pivoting said closure piece into said first position.

4. The cable holder of claim 3, said closure piece and said grab portion being rigidly connected to each other so as to define a single piece pivotally journalled in said side walls.

5. The cable holder of claim 4, said resilient biasing means comprising a leg spring surrounding said pivot means and having a first leg braced against said wall means and a second leg braced against said grab portion.

6. The cable holder of claim 5, said wall means including an end wall defining a wall opening leading into said chamber; and, said single piece being pivotally mounted in said wall opening so as to at least partially close off said chamber to the outside when said single piece is in said second position; and, said single piece having a back wall which is flush with said end wall when said single piece is in said second position.

7. The cable holder of claim 5, said closure piece and a wall of said wall means conjointly defining said holding means when said closure piece is in said second position; said single piece being configured as a two-arm lever having a first arm defining said grab portion and a second arm defining said closure piece; said closure piece being pivoted into said first position by pressure applied to said closure piece with the cable segment to be inserted into said recess and, for opening said holding means, said grab portion is pivoted against the force of said leg spring.

8. The cable holder of claim 1, said wall means including a rear wall of said chamber and a bottom wall thereof, said wedge-shaped holding means including a clamping surface formed on said closure piece to face toward said recess and having an arcuate shaped, said clamping surface and said bottom wall conjointly defining a funnel-like outline widening as said outline extends toward said rear wall when viewed in section.

9. The cable holder of claim 8, said clamping surface defining a circular arc relative to said pivot axis when viewed in section.

10. The cable holder of claim 1, said work apparatus has a housing and said wall means being part of said housing.

11. The cable holder of claim 10, said housing being configured of two parts in the region of said chamber; and, said two parts conjointly defining a center plane perpendicular to said pivot axis and partitioning said chamber.

* * * * *